Jan. 27, 1959   J. BURNHAM   2,871,425
CAPACITOR
Filed Sept. 16, 1954

Inventor,
John Burnham,
By: Schneider & Dressler,
Attys.

United States Patent Office 2,871,425
Patented Jan. 27, 1959

2,871,425

CAPACITOR

John Burnham, Los Angeles, Calif., assignor to Fansteel Metallurgical Corporation, a corporation of New York Application September 16, 1954, Serial No. 456,378

20 Claims. (Cl. 317—230)

This invention relates to a capacitor, and in particular relates to a tantalum capacitor having a stable dielectric film having a high breakdown voltage and good dielectric characteristics, an electrolyte therefor, and to a method of forming a tantalum electrode suitable for use in either a capacitor or rectifier.

While the invention may be applied to other film-forming metals, such as aluminum, zirconium, magnesium, titanium, beryllium and the like, the advantages of tantalum are so great that it is preferred and the invention will be described in connection therewith.

Tantalum as a film-forming electrode for electrolytic rectifiers and capacitors has been known for many years. The prior art, both patent and practical, discloses numerous and varied electrolytes for film-forming and for operating with tantalum. While many different electrolytes and mixtures have been proposed for tantalum, the practical development of tantalum rectifiers and capacitors is tending toward the use of highly corrosive electrolytes.

Tantalum capacitors have inherently great advantages over other capacitors in respect to physical size and operating life. Because of these advantages, the practical art is turning toward tantalum capacitors, even though highly corrosive electrolytes presently appear to be a necessary evil. Where a tantalum capacitor is to operate in circuits having a potential difference across the capacitor of at least about 75 volts or more, a tantalum capacitor presently requires a highly corrosive electrolyte. The most common electrolyte in use is a solution of sulphuric acid. This electrolyte is used as an operating electrolyte, the electrolyte for film-forming generally being substantially different. With a sulphuric acid electrolyte, the maximum potential rating for a tantalum capacitor will generally be of the order of about 140 volts. With other electrolytes, such as, for example, ammonium chloride, the potential rating will generally be of the order of about 95 volts. The potential rating for other filmed metals is even lower.

While tantalum, either in the form of a foil or in the form of a sintered porous mass, can withstand the corrosive effect of electrolytes such as sulphuric acid and the impurities commonly present in corrosive electrolytes, serious complications arise because of the very nature of the electrolyte. The manufacture of capacitors containing corrosive electrolytes requires the use of machinery and materials which withstand corrosion arising out of the use of the electrolyte. It is also imperative that such materials have neither an adverse nor poisonous effect upon the capacitor when dissolved in minute amounts in the corrosive electrolyte. In addition, the presence of a corrosive electrolyte requires the use of a cathode material in a polarized capacitor which will substantially resist the effects of the electrolyte. Further, sealing insulator materials must also withstand the corrosive effects of the electrolyte. Consequently, tantalum capacitors using sulphuric acid electrolytes generally have a silver housing functioning as a cathode and are limited in the nature of insulating materials separating the cathode and anode.

Tantalum electrodes, whether of foil or of sintered porous material, may have the dielectric film formed thereon in a number of different electrolytes. The forming potential determines the character of the film formed on the tantalum. A high polarizing potential during the forming operation of the tantalum electrode may be used but as presently known, the higher the forming potential, the poorer is the dielectric quality of the film resulting therefrom. A poor dielectric film has excessive leakage current in the blocking direction. This is generally true for all film-forming metals.

The unsatisfactory nature of the film formed on tantalum under an excessive polarizing potential may be recognized by its appearance. A tantalum electrode generally has a milky color, and in the case of a sintered electrode, there is a tendency for parts of the electrode to break off from the parent body. Thus, the electrical continuity of a sintered electrode is destroyed.

In the case of a foil electrode, the film tends to scale from the parent body of tantalum. The exposed tantalum surface tends to conduct in both directions with some tendency for electroforming of the film at the sloughed surfaces. However, since electroforming of a film must be done under carefully controlled, prescribed conditions to secure a tough compact film, the tendency toward reformation of an oxide film is not productive of any desirable results.

Because of the requirements of long life and stability of a dielectric film, together with a high ohmic resistance of the film in the blocking direction, the practical art has electroformed the film on tantalum and other film-forming metals in one type of electrolyte and has actually operated the filmed electrode as a capacitor electrode in an entirely different type of electrolyte. This has necessitated elaborate intermediate steps between film-forming and final assembly of the capacitor to prevent any interaction between the electroforming electrolyte and the operating electrolyte. In spite of these disadvantages, and in spite of the corrosive nature of sulphuric acid and the practical difficulties of using the same in manufacturing operations, the practical art has developed and manufactured tantalum capacitors using sulphuric acid electrolytes.

Even a finished and sealed capacitor containing sulphuric acid represents a hazard which the art has assumed. A sealed capacitor containing a quantity of highly corrosive electrolyte, such as sulphuric acid, may under conditions of excessive potential or mechanical shock spill its contents with resultant damage to surrounding apparatus and wiring. Sulphuric acid itself does not evaporate and a quantity of this electrolyte will remain indefinitely until the effects of corrosion by the acid have transformed the acid to a sulphate or other compound.

This invention provides a filmed electrode for a capacitor and electrolyte having manufacturing and operating characteristics far superior to the characteristics presently known. The electrolyte of this invention may be used either as an electroforming electrolyte or operating electrolyte or both, thus eliminating or reducing any chemical or cleaning processes or steps intervening the forming and operating conditions of the electrode. Additionally, the invention provides an electrolyte which is substantially non-corrosive and whose presence may be tolerated without substantial danger or damage to machinery during manufacturing or by apparatus within which a finished capacitor may be disposed. The new capacitor containing the new electrolyte has all the advantages of stability and high capacitance present in conventional electrolytic capacitors, and in addition the tantalum or other film-forming metal electrode will withstand potentials far greater than what customarily has been considered as practical.

An electrode having a film formed thereon in accordance with this invention has great stability and long life, and has the desirable faculty of not being permanently and irreparably damaged by transient over-voltages.

An additional desirable characteristic of a capacitor embodying the present invention is the maintenance of its operating characteristics over wide ambient temperature ranges. In the case of a tantalum capacitor employing a sulphuric acid electrolyte, a desirable characteristic is the maintenance of its operating characteristics down to a temperature as low as —65° F. The electrolyte embodying the present invention and capacitor using the new electrolyte have equally desirable characteristics in this respect. The new electrolyte does not freeze and retains its desirable viscosity down to low temperatures of this order. In addition, the new capacitor having the new electrolyte has desirable electrical characteristics in that the leakage current per unit of capacitance is as low as any electrolytic capacitor. Other characteristics, such as phase angle, are also as good as any conventional electrolytic capacitor.

The invention in general contemplates the use of halogen-substituted acetic acids with acetic acid in water solution for the development of a film on tantalum or other film-forming metal and for the maintenance of such film in the operation of a rectifier or capacitor. While the different halogen-substituted acetic acids, for example the mono-, di- and tri-chloracetic acids and the corresponding bromo, iodo, and fluoro acetic acids, may vary among themselves in regard to ionization and electrical conductivity, any one or combination of the halogen-substituted acetic acids with acetic acid and water is far superior to electrolytes hitherto used or proposed. In the various halogen-substituted acetic acids, there are differences not only because of the nature of the halogen substituent but also because of the degree of substitution. The degree of ionization increases as the degree of substitution increases; the tri-substituted halogen having a higher ionization constant than the di-substituted halogen and this in turn having a higher ionization constant than the mono-substituted halogen. The ionization constant also increases with the electro-negative position of the halogen, iodine being at the low end and fluorine being at the high end of the range.

Everything else being the same, the proportion of water in the electrolyte will have a profound effect on the ionization characteristics. Additionally, the amount of acetic acid present in the electrolyte will be a factor. The presence of one or more halogen-substituted acetic acids increases the hydrogen ion concentration of the solution, thereby increasing the conductivity of the solution. It has been found that the acetic acid improves the formation characteristics of the new electrolyte and makes possible the formation and maintenance of good films on film-forming metals such as tantalum.

The new electrolyte generally may be used for film-forming or capacitor operation. The specific electrolyte for film-forming need not necessarily be identical, either qualitatively or quantitatively, with the electrolyte for capacitor operation, but it may be. Since film-forming is done usually under carefully controlled conditions of temperature, concentration, current, potential and time, it is practical and desirable to use different concentrations than for capacitor operation. When employing the new electrolyte for capacitor operation, a wide range of operating conditions may have to be considered. It may also be desirable to use different materials within the broader concepts of the invention for film-forming than for capacitor operation. However, since the electrolytes for film-forming and operation are fundamentally alike, a minimum of cleaning of the formed electrode is necessary for use in a capacitor. In many instances, no cleaning is necessary and the electrolyte absorbed by the formed electrode may be considered as a desired additive to the operating electrolyte.

In general, the new electrolyte includes water and one or more of the halogen-substituted acetic acids and acetic acid. The water present in the electrolyte may be due to the water present in the acetic acid and/or the halogen-substituted acetic acid or acids.

For a more complete understanding of the invention, reference will now be made to the drawings wherein an exemplary embodiment of a capacitor utilizing the invention is disclosed, it being understood, however, that the mechanical details of the capacitor are suggestive and that the invention is in no way to be limited thereto.

Figure 1:
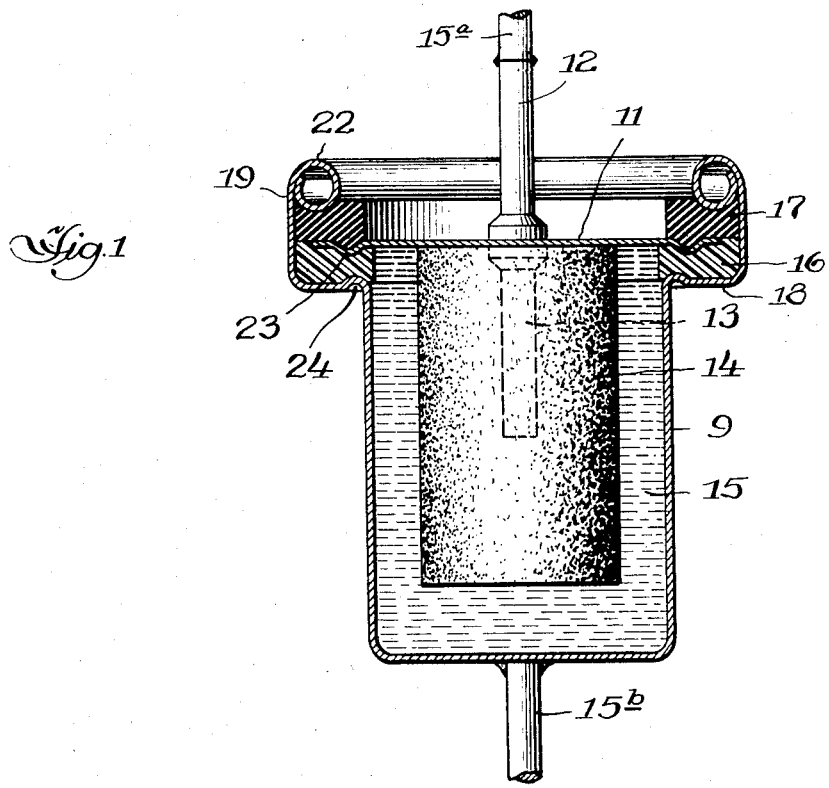
Figure 1 is a partial sectional view of one form of capacitor wherein the invention may be embodied.

Referring first to Figure 1, there is shown an electrolytic capacitor having housing or can 9. This housing is of metal and in the construction illustrated should for mechanical reasons preferably be of a metal which is ductile and draws easily. Housing 9 may be of silver, tantalum, silver with an interior coating of tantalum, or of any other metal which will not react with the electrolyte forming part of the invention herein. Such other metals may consist of iron (in various forms as stainless steel), lead, palladium, precious metals as gold and platinum, or any conductor such as carbon, etc. which is stable in the electrolyte.

Silver is highly desirable as a cathode material as it is inert with respect to the electrolytes to be hereinafter disclosed and it may be used with a wide variety of gasket materials. Silver has excellent heat and electrical conductivities and is so ductile that it may be readily drawn and crimped. In the event that the housing or can 9 is to have an inner coating of tantalum, such inner coating may be obtained by deposition. It is also possible to attach sintered tantalum material to the inside surface of the housing to provide a capacitor with two filmed tantalum electrodes.

An electrode assembly is carried by the housing 9. The assembly includes a disc 11 having a pin 12 secured to the outside surface thereof and extending outwardly therefrom. A support pin 13 is secured to the opposite, inside surface of the disc 11 and extends outwardly therefrom. The two pins 12 and 13 are rigidly attached to the respective disc surfaces by welding or other suitable means.

A mass of porous metal 14 is carried by support pin 13 and is finally secured to disc 11 and to support pin 13 as by pressing and sintering operations. This mass of porous metal should be the same composition as the metal pin 13. It will have formed thereon, in accordance with the present invention, an oxide film of extreme thinness possessing a high dielectric constant and unusually high break-down value. In the event that a non-polarized condenser is to be provided, the same porous metal may also be applied to the interior of housing 9 as previously indicated. Housing 9 contains electrolyte generally indicated by 15, embodying the present invention and to be described in detail later.

It preferred that the disc 11, the pins 12 and 13, the porous mass of metal 14, and the inside of the housing 9 be of the same metal and excellent results are achieved when the metal is tantalum.

It is further preferred to provide leads for the capacitor so that it may be easily wired or soldered into a circuit without danger to the capacitor proper. Accordingly, leads 15a and 15b may be soldered, welded, or otherwise permanently attached to pin 12 and housing 9 as shown. These leads are preferably of copper or nickel and sufficiently long for the desired purpose.

In the specific construction herein illustrated, there is provided an inner sealing ring 16 below the annular rim of disc 11 and an outer sealing ring 17 above the annular rim of disc 11. It is possible to have one of the two sealing rings recessed to accommodate the thickness of the disc 11. Recesses in both sealing rings may be provided.

Inner sealing ring 16 rests upon outwardly extending shoulder 18 formed in the housing 9. Since this inner sealing ring 16 is directly in contact with the electrolyte, it must be of a material which is stable over a wide range of temperatures and which is inert to the electrolyte. The construction herein described is more fully described and claimed in the co-pending application of O. S. Aikman, Serial Number 248,899, filed September 29, 1951. In the capacitor described and claimed in said application, the electrolyte is concentrated sulphuric acid. Because of the nature of this electrolyte, a preferred material for sealing ring 16 is the synthetic plastic polytetrafluoroethylene sold under the trade name "Teflon." Other materials as disclosed in said application are polytrifluorochloroethylene, sold under the trade name "Kel-F," and additional examples as given in said application. However, because of the relatively inert nature of the electrolyte embodying the present invention, sealing ring 16 may consist of any one of the above identified materials as well as many other materials, such as rubber, either natural or synthetic, or any of the numerous plastics available on the market. Inasmuch as many materials, both synthetic and natural, are inert to the electrolyte embodying the present invention, a wide choice of sealing ring material is possible. In general, the nature of the sealing ring material will be dictated more by temperature characteristics, cold flow characteristics, elasticity and the like, rather than resistance to attack by the electrolyte.

Outer sealing ring 17 is provided, and this may be made of any desirable material, such as synthetic rubber, like the rubbery copolymer of butadiene and acrylonitrile (Buna-N) or the rubbery copolymer of butadiene and styrene (Buna-S).

In the Aikman application referred to, the corrosive nature of the electrolyte limited the choice of materials for inner sealing ring 16. The preferred materials for a sulphuric acid electrolyte are generally inelastic and have a cold flow characteristic. Accordingly, outer sealing ring 17 was of a material selected for its elasticity. Additional details of construction to be described herein were also provided because of the limited choice of sealing ring materials in the Aikman application. Because of the relatively inert nature of the present electrolyte, either one or both of sealing rings 16 and 17 may be of elastic material.

The peripheral boundaries of the two sealing rings rest against wall portion 19 of housing 9, this wall portion extending axially of and away from shoulder 18. Wall portion 19 of the housing metal extends beyond the two sealing rings and is crimped or turned over and inwardly to form a hollow, generally toroidal shaped flange 22. The metal forming the flange is curled inwardly in any suitable manner as by a suitably shaped die.

In the construction illustrated herein, annular ribs 23 and 24 are provided in disc 11 and housing 9, respectively. Rib 24 in the housing is at the intersection of the side wall of the housing proper and shoulder 18. This rib is concave from outside of the housing so as to extend into the bottom portion of inner sealing ring 16. Rib 24 functions as a dam to prevent cold flow of the bottom part of the material forming inner sealing ring 16 in the event that the sealing ring has this characteristic. Where the sealing ring has substantial elasticity and negligible cold flow, annular rib 24 is not essential. However, since a sharp bend of the housing metal is undesirable, annular rib 24 may be conveniently provided even though it may not be essential. Rib 23 is provided to permit some contraction and expansion of disc 11 under varying temperature conditions.

Rib 23 is formed so that it extends into the material of lower sealing ring 16 and rib 23 is preferably laterally offset from rib 24. As previously pointed out, the less rigorous requirements of the new electrolyte provide a greater choice of sealing materials and also provide greater flexibility in the mechanical design of the electrodes and sealing construction. Thus, annular rib 23 may be omitted or the rib may extend upwardly. The capacitor construction described herein has proven to be effective with highly corrosive electrolytes as sulphuric acid and this construction is even more effective for the relatively inert electrolyte embodying the present invention. However, numerous variations in construction of the capacitor are possible because of the relative inertness of the new electrolyte.

The maximum potential in forming is generally higher than the potential at which the electrode is later used. Thus the forming potential may be about 25% or 30% higher than the rated potential for use. In the case of electrolytes embodying the present invention, potentials of from about 175 to as much as 300 volts may be used in forming.

A suitable electrolyte for film-forming or as a conducting solution in electrolytic capacitors comprises from about 2% to about 95% by weight of water and a remainder portion which consists of one or more halogen-substituted acetic acids and acetic acid in proportions of from about 5% to about 50% by weight of the remainder portion of the halogen-substituted acetic acid and from about 95% to about 50% by weight of the remainder portion of acetic acid. Such an electrolyte is suitable for film-forming of or for operation of a tantalum electrode (either sheet or sintered) electrolytic capacitor.

In making such an electrolyte it is preferred to form a composite ingredient comprising from about 5% to about 50% by weight of one or more halogen-substituted acetic acids and from about 95% to 50% of acetic acid, the acetic acid employed being in the form of glacial acetic acid. The mixture of halogen-substituted acetic acid or acids and acetic acid as a composite ingredient is then mixed with water in proportions ranging from about 2% water to as much as about 95% water, the remainder in each instance comprising the composite ingredient.

When the electrolyte solution of this invention consists of about 95% water and about 5% of the composite ingredient (acetic acid and halogen-substituted acetic acid or acids), it may not be able to carry sufficiently heavy current for forming within reasonably short times even though highly ionized. In industrial operations, it may be desirable to have less than 95% water and a higher percentage of the mixture of acetic acid and halogen-substituted acetic acid or acids. At the opposite end of the range, a low percentage of water tends to retard ionization. It is therefore preferred to have a water content of between about 4% and about 85%, the remainder being the composite ingredient previously described.

The preferred halogen-substituted acetic acid is chloroacetic acid and of the three forms, the trichloroacetic acid is preferred.

A film formed with a chlorine-substituted acetic acid is generally free from graying and formation of localized heavy oxide deposits. As is well known, an anode having a suitable film formed thereon shows a violet characteristic. Heavy gray or heavy oxide deposits are undesirable in the film.

The bromo-substituted, iodo-substituted and fluoro-substituted acetic acids may also be used with satisfactory results.

Following are examples of electrolytes embodying the invention, said electrolytes being usable in forming an anode or in a capacitor utilizing the formed anode.

An electrolyte consisting of about 12.3% (by weight) of trichloroacetic acid, 4% water and remainder glacial acetic acid used with tantalum permitted the forming potential to go up to 300 volts. The anode may be formed in this solution at a temperature of around 90–100° C.

An electrolyte consisting of about 8.9% (by weight) of trifluoroacetic acid, about 4.1% water and remainder glacial acetic acid was also used successfully in forming a tantalum anode. The forming temperature, potential and procedure were about the same as in the first example.

In both examples, the leakage current on reverse potential was about 7 milliamperes, the anode being of the porous type and weighing about 0.6 gram, of which about .3 gram is the weight of the porous portion.

In a third example, a tantalum anode was film-formed under the following conditions. The electrolyte consisted of about 90 cc. of acetic anhydride, about 10 cc. of trifluoroacetic acid and about 16 cc. of water. The tantalum anode to be formed had a weight of about 3.6 grams, while the tantalum cathode had a weight of about 5.3 grams. Both electrodes were of the porous sintered type. The electrolyte temperature was maintained between about 75° C. and about 95° C. until a polarizing potential of about 260 volts was reached. The current was maintained during this time at about 14 milliamperes per gram of anode weight. The electrolyte was then permitted to cool to about 20° C. and the 260 volt polarizing potential was maintained for about 16 hours. After the electrolyte had cooled to about 20° C., the current density dropped to about half of its previous value. The forming potential was constant. The finished anode was tested in the forming solution, using a fine silver can as the cathode. The can had previously been cleaned with nitric acid. When tested on a bridge at 60 cycles, the capacitance measured 16.35 microfarads. The formed anode had a leakage current of less than .1 milliampere at 340 volts, direct potential. The dissipation factor was about 25%. The same forming procedure using the chlorine-substituted acetic acids will give even more satisfactory results.

In another example, a tantalum anode was film-formed under the following conditions: The electrolyte consisted of about 74 grams of acetic acid anhydride, about 12.7 grams of tri-chloroacetic acid, and about 17 grams of water. The porous tantalum anode to be formed had a weight of about 0.29 gram, while the tantalum cathode had a weight of about 4 grams. The electrolyte temperature was maintained between 90 degrees C. and about 100 degrees C. until a polarizing potential of about 300 volts was reached. The current was maintained during this time at about 27 milliamperes per gram of anode weight. The electrolyte was then permitted to cool to about 30 degrees C. and the 300 volt polarizing potential was maintained for about 16 hours. After the electrolyte had cooled to about 20 degrees C., the current density dropped to about one-fourth of its previous value. The forming potential was constant. The finished anode was tested in the forming solution, using a fine silver can as cathode.

In general, the tri-substituted halogen is better than the di-substituted and this in turn is better than the mono-substituted halogen.

The electrolytes may be used for forming or in electrolytic capacitors with formed anodes.

Figure 2:
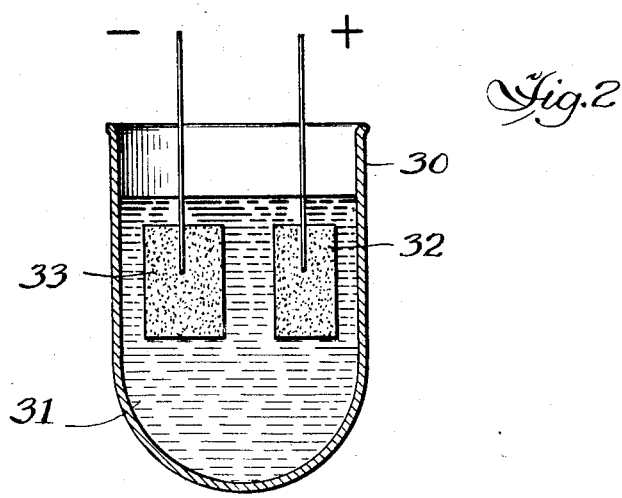
Figure 2 is a diagrammatic sectional view of a film-forming setup.

Referring to Figure 2, a simple film-forming setup is illustrated. This comprises container or housing 30 of any suitable material such as, for example, glass or other material of electrically insulating material chemically inert to the electrolyte. Container 30 contains a film-forming electrolyte 31 and within this film-forming electrolyte are anode 32 and cathode 33. These two electrodes are preferably of tantalum and may be similar in construction to the anode described in Figure 1. Thus each electrode may have a mass of sintered tantalum material. The cathode may have a dielectric film formed thereon or not, as desired. The two electrodes are connected to a suitable source of direct current at a suitable potential.

With regard to film-forming, the temperature and current density may be varied and in turn this will affect the film-forming time. In general, film-forming technique used in forming films on film-forming metals with conventional electrolytes may be used with the new electrolytes. The maximum polarizing potential for film-forming may be substantially greater because of the new electrolyte and the resulting anode will have a higher potential rating. The new anode may be used in a rectifier instead of a capacitor, the operating electrolyte being equally useful for rectifiers or capacitors. The dielectric film developed on a suitable metal in accordance with this invention has stable shelf life.

The foregoing detailed description is given for clearness of understanding only, and no unnecessary limitations should be understood therefrom, for some modifications will be obvious to those skilled in the art.

What is claimed is:

1. A method of forming a dielectric film on an electrode for use in an electrolytic type of capacitor or rectifier, said method comprising: disposing an electrode of film-forming metal in an electrolyte containing from about 2% to about 95% by weight of water and a remainder portion consisting of at least one halogen-substituted acetic acid and acetic acid in proportions ranging from about 5% to about 50% by weight of the remainder portion of the halogen-substituted acetic acid and from about 95% to about 50% by weight of the remainder portion of acetic acid; connecting said electrode as an anode; providing a cathode in said electrolyte; and impressing a potential thereon for a period sufficient to create a dielectric film upon said anode, said film being characterized by high resistance to potential breakdown.

2. A method according to claim 1 wherein the maximum forming potential is about 300 volts.

3. A method according to claim 2 wherein the electrolyte is maintained at a temperature of between about 90 degrees C. and about 100 degrees C. until the maximum potential is reached.

4. A method of forming a dielectric film on a tantalum electrode, said method comprising: disposing said tantalum electrode as an anode in an electrolyte containing from about 2% to about 95% by weight water and a remainder portion consisting of at least one halogen-substituted acetic acid and acetic acid in proportions ranging from about 5% to about 50% by weight of the remainder portion of the halogen-substituted acetic acid and from about 95% to about 50% by weight of the remainder portion of acetic acid; impressing thereon a forming potential; and maintaining said forming potential for a period sufficient to create the formed film.

5. A method according to claim 4 wherein said chlorine-substituted acetic acid is trichloroacetic acid.

6. A method according to claim 4 wherein said chlorine-substituted acetic acid is dichloroacetic acid.

7. A method of forming a dielectric film on a tantalum electrode, said method comprising: disposing said tantalum electrode as an anode in an electrolyte containing from about 2% to about 95% by weight of water and a remainder portion consisting of at least one halogen-substituted acetic acid and acetic acid in proportions ranging from about 5% to about 50% by weight of the remainder portion of the halogen-substituted acetic acid and from about 95% to about 50% by weight of the remainder portion of acetic acid; providing a cathode in said electrolyte; and impressing thereon a forming potential, maintaining said forming potential for a period sufficient to create the formed film.

8. A method of forming a dielectric film on a tantalum electrode, said method comprising: disposing said tantalum electrode as an anode in an electrolyte containing about 12.3% by weight of trichloroacetic acid, about 4% by weight of water and remainder acetic acid; providing a cathode in said electrolyte; and impressing thereon a forming potential, maintaining said forming potential for a period sufficient to create a film.

9. A capacitor comprising at least one electrode of a film-forming metal having a dielectric film thereon and an electrolyte containing from about 2% to about 95% by weight water and the remainder being a composite ingredient, said composite ingredient consisting of a mixture of acetic acid and at least one halogen-substituted acetic acid in proportions ranging from about 5% to about 50% by weight of halogen-substituted acetic acid and from about 95% to about 50% by weight of acetic acid.

10. A capacitor according to claim 9 wherein said halogen-substituted acetic acid is a chlorine-substituted acetic acid.

11. A capacitor according to claim 9 wherein the halogen-substituted acetic acid is trichloroacetic acid.

12. A capacitor according to claim 9 wherein the halogen-substituted acetic acid is dichloroacetic acid.

13. A capacitor according to claim 9 wherein the halogen-substituted acetic acid is a bromine-substituted acetic acid.

14. A capacitor according to claim 9 wherein the halogen-substituted acetic acid is an iodine-substituted acetic acid.

15. A capacitor according to claim 9 wherein said halogen-substituted acetic acid is a fluorine-substituted acetic acid.

16. An electrolyte for use in anodic film-forming and as a conducting solution in electrolytic capacitors consisting essentially of: from about 2% to about 95% by weight of water and a remainder portion consisting of at least one halogen-substituted acetic acid and acetic acid in proportions ranging from about 5% to about 50% by weight of the remainder portion of the halogen-substituted acetic acid and from about 95% to about 50% by weight of the remainder portion of acetic acid.

17. An electrolyte according to claim 16 wherein said halogen is chlorine.

18. An electrolyte according to claim 16 wherein the halogen is fluorine.

19. An electrolyte according to claim 16 wherein the halogen is bromine.

20. An electrolyte according to claim 16 wherein the halogen is iodine.

References Cited in the file of this patent

UNITED STATES PATENTS

| | | |
|---|---|---|
| 2,089,685 | Clark | Aug. 10, 1937 |
| 2,556,228 | Souders | June 12, 1951 |
| 2,617,863 | Stinson | Nov. 11, 1952 |
| 2,694,678 | McLeod | Nov. 16, 1954 |

OTHER REFERENCES

Annalen der Physik (1907), vol. 328 of complete series (vol. 23 of 4th series), pages 230–238 of article by Schulze.